US012253006B2

(12) United States Patent
Kray et al.

(10) Patent No.: US 12,253,006 B2
(45) Date of Patent: Mar. 18, 2025

(54) COMPOSITE AIRFOIL ASSEMBLY HAVING A DOVETAIL PORTION

(71) Applicant: GENERAL ELECTRIC COMPANY, Schenectady, NY (US)

(72) Inventors: Nicholas Joseph Kray, Mason, OH (US); Elzbieta Kryj-Kos, Evendale, OH (US); Tod Winton Davis, Liberty Township, OH (US); Gary Willard Bryant, Jr., Loveland, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/088,957

(22) Filed: Dec. 27, 2022

(65) Prior Publication Data

US 2024/0209741 A1 Jun. 27, 2024

(51) Int. Cl.
*F01D 5/28* (2006.01)
*F01D 5/14* (2006.01)
*F01D 5/30* (2006.01)

(52) U.S. Cl.
CPC ............ *F01D 5/282* (2013.01); *F01D 5/147* (2013.01); *F01D 5/3007* (2013.01); *F05D 2220/32* (2013.01); *F05D 2240/24* (2013.01); *F05D 2240/30* (2013.01); *F05D 2300/603* (2013.01)

(58) Field of Classification Search
CPC ...... F01D 5/282; F01D 5/3092; F01D 5/3007; F01D 5/147; F01D 5/3084; F01D 5/284; F01D 5/28; F01D 5/288; F01D 11/008; F01D 5/22; F01D 11/006; F01D 5/028; F01D 9/041; F01D 25/005; F01D 5/025; F01D 5/30; F01D 5/3023; F01D 5/34; F01D 7/00; F05D 2220/36; F05D 2300/603; F05D 2300/6033; F05D 2300/6034; F05D 2220/32; F05D 2300/6012; F05D 2230/60; F05D 2240/80; F05D 2300/614; F05D 2230/23; F05D 2230/31; F05D 2240/30; F05D 2300/10; F05D 2300/6032; F05D 2230/53; F05D 2240/24; F05D 2240/306; F05D 2240/305; F05D 2250/70; F05D 2300/702; F04D 29/324; F04D 29/325; F04D 29/322; F04D 29/34
See application file for complete search history.

(56) References Cited

U.S. PATENT DOCUMENTS

| | | | |
|---|---|---|---|
| 5,375,978 A * | 12/1994 | Evans | B64C 11/26 416/241 A |
| 8,100,662 B2 * | 1/2012 | Schreiber | B29C 70/202 416/248 |
| 8,105,042 B2 | 1/2012 | Parkin et al. | |
| 8,419,374 B2 | 4/2013 | Huth et al. | |
| 8,573,947 B2 | 11/2013 | Klinetob et al. | |
| 8,662,855 B2 | 3/2014 | Naik et al. | |
| 8,696,319 B2 | 4/2014 | Naik | |
| 9,482,108 B2 | 11/2016 | Garcia Crespo | |
| 10,202,853 B2 | 2/2019 | Kleinow | |

(Continued)

*Primary Examiner* — Eric J Zamora Alvarez
(74) *Attorney, Agent, or Firm* — McGarry Bair PC (57) ABSTRACT

A composite blade assembly for a turbine engine. The composite blade assembly having a core, a first skin and a second skin. The core having a composite structure. The first skin having at least one composite ply. The second skin having at least one composite ply. The first skin having a first radius. The second skin having a second radius.

18 Claims, 3 Drawing Sheets

(56) References Cited

U.S. PATENT DOCUMENTS

| | | |
|---|---|---|
| 10,358,929 B2 | 7/2019 | McCaffrey et al. |
| 10,556,367 B2 | 2/2020 | Marin et al. |
| 10,589,475 B2 | 3/2020 | Kray et al. |
| 2009/0165924 A1 | 7/2009 | Steibel et al. |
| 2011/0194941 A1 | 8/2011 | Parkin et al. |
| 2014/0112796 A1 | 4/2014 | Kray et al. |
| 2016/0160658 A1* | 6/2016 | McCaffrey ............. F01D 5/282 29/889.71 |
| 2019/0277141 A1* | 9/2019 | Gill ....................... B29C 53/382 |
| 2021/0246791 A1* | 8/2021 | McCaffrey ............ F01D 5/3084 |

* cited by examiner

COMPOSITE AIRFOIL ASSEMBLY HAVING A DOVETAIL PORTION

TECHNICAL FIELD

The disclosure generally relates to a composite airfoil assembly having a dovetail portion, and more specifically to a composite airfoil assembly having the dovetail portion within a turbine engine.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blade and stationary vanes. The blades are mounted to rotating disks, while the vanes are mounted to stator disks.

During operation air is brought into the compressor section through the fan section where it is then pressurized in the compressor and mixed with fuel in the combustor for generating hot combustion gases which flow downstream through the turbine stages where the air is expanded and exhausted out an exhaust section. The expansion of the air in the turbine section is used to drive the rotation sections of the fan section and the compressor section. The drawing in of air, the pressurization of the air, and the expansion of the air is done, in part, through rotation of various rotating blades mounted to respective disks throughout the fan section, the compressor section and the turbine section, respectively. The rotation of the rotating blades imparts mechanical stresses along various portions of the blade; specifically, where the blade is mounted to the disk.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the disclosure herein are directed to a turbine engine including a composite airfoil assembly including a dovetail portion and an airfoil portion. The composite airfoil can be used at one or more locations within the turbine engine. For example, the composite airfoil assembly is very suitable as a fan blade in a fan section of a turbine engine. Although other locations, such as the compressor section and turbine section are contemplated. The composite airfoil assembly can be mounted in a variety of ways. One such mounting is securing the blades to a spinner of the fan section, directly, or via a pitch control assembly. Wherever the composite airfoil assembly is located, one suitable mounting is a disk assembly that has complementary sockets to receive the dovetail portion, with the sockets circumferentially spaced about the periphery of the disk assembly. The composite airfoil assembly and disk assembly can collectively form a rotating assembly such that the composite airfoil assembly is a composite blade assembly.

The composite airfoil assembly further includes a core, a first skin and a second skin. The core and the first skin overlie respective portions of the dovetail and the airfoil. The second skin overlies a respective portion of the dovetail. The composite airfoil assembly including the core, the first skin and the dovetail is designed to withstand high mechanical stresses associated with the operation of the turbine engine. For purposes of illustration, the present disclosure will be described with respect to a composite airfoil assembly for a turbine engine, specifically a composite airfoil assembly provided within a fan section of the turbine engine. It will be understood, however, that aspects of the disclosure described herein are not so limited and can have general applicability within other engines or within other portions of the turbine engine. For example, the disclosure can have applicability for a composite airfoil assembly in other engines or vehicles, and can be used to provide benefits in industrial, commercial, and residential applications. Further, aspects of this disclosure will be directed towards a composite blade assembly including a dovetail portion. It will be appreciated that aspects this disclosure are directed towards any composite airfoil assembly having a dovetail portion including, but not limited to, a composite blade assembly or a composite vane assembly.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine wherein at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The terms "metallic" as used herein are indicative of a material that includes metal such as, but not limited to, titanium, iron, aluminum, stainless steel, and nickel alloys. A metallic material or alloy can be a combination of at least two or more elements or materials, where at least one is a metal.

Figure 1:
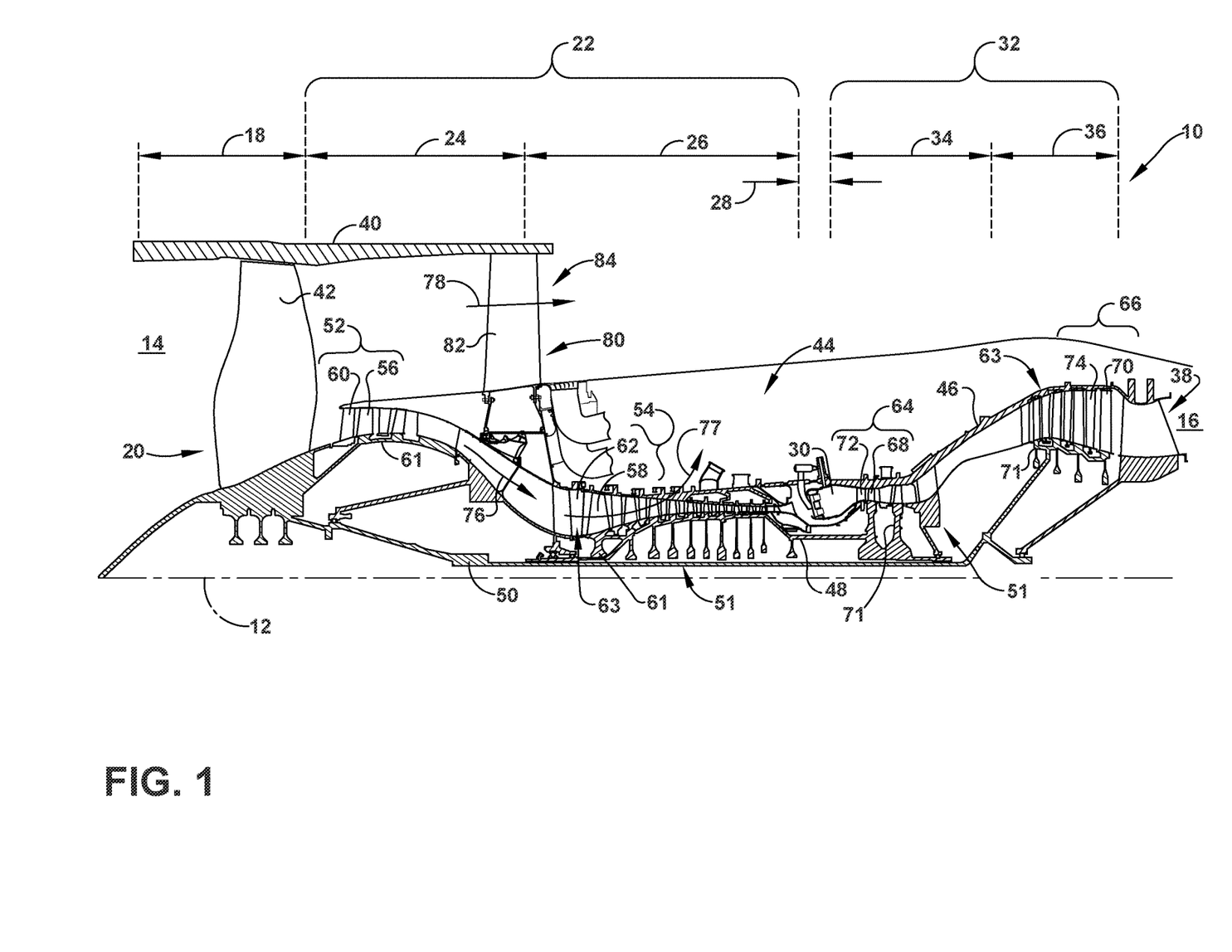
FIG. 1 is a schematic cross-sectional view of a turbine engine in accordance with an exemplary embodiment of the present disclosure.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow 78 bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
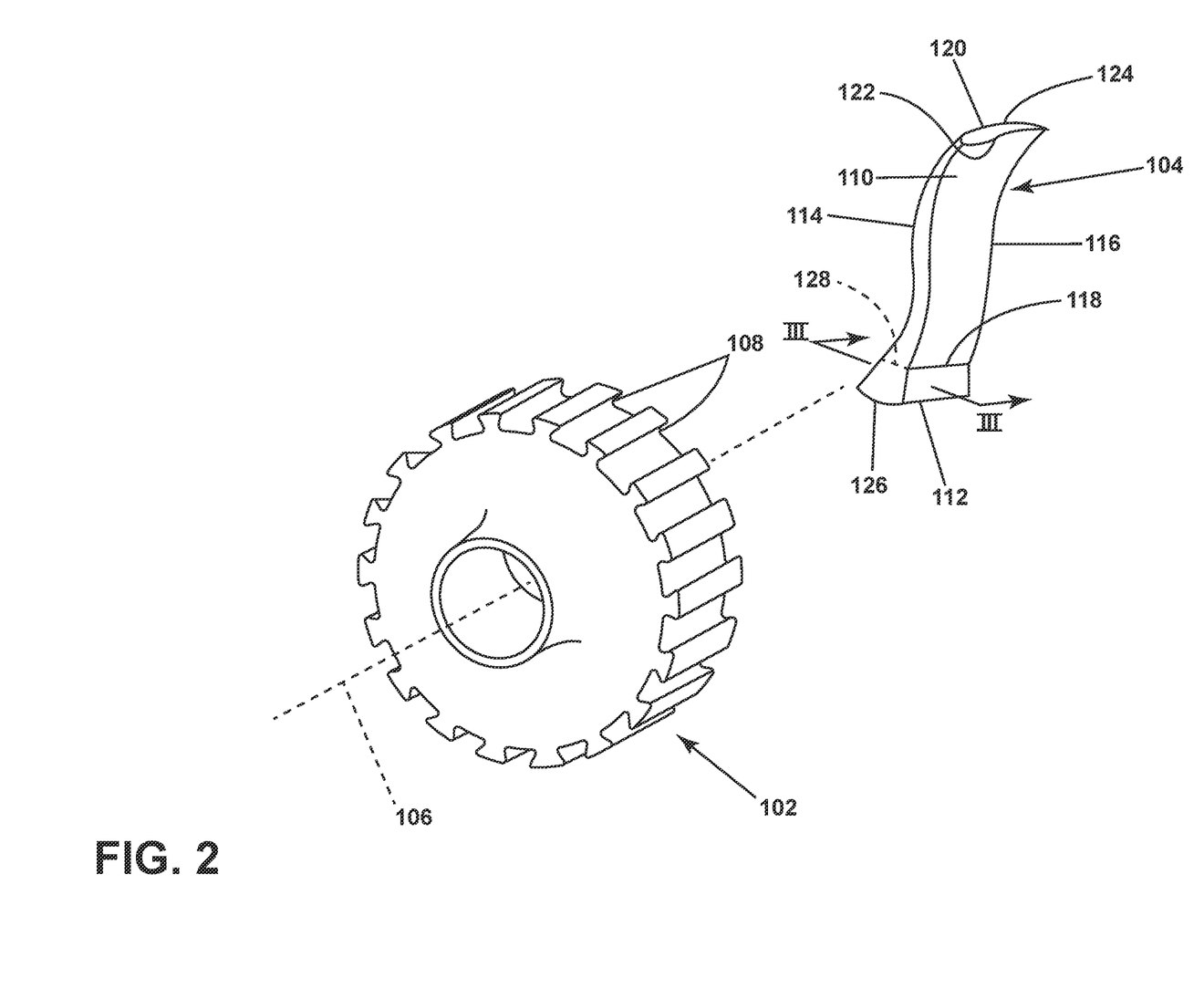
FIG. 2 is a schematic perspective view of a composite airfoil assembly and disk assembly suitable for use within the turbine engine of FIG. 1, the composite airfoil assembly including an airfoil and a dovetail.

FIG. 2 is a schematic perspective view of a composite airfoil assembly 104 and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the turbine engine 10. The composite airfoil assembly 104 can be rotating or non-rotating such that the composite airfoil assembly 104 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 104 can be a composite fan blade assembly.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106.

The composite airfoil assembly 104 includes an airfoil portion 110 and a dovetail portion 112 extending from the airfoil portion 110. The airfoil portion 110 extends between a leading edge 114 and a trailing edge 116 to define a chord-wise direction. The airfoil portion 110 extends between a root 118 and a tip 120 to define a span-wise direction. The airfoil portion 110 includes a pressure side 122 and a suction side 124. The dovetail portion 112 extends between a first end 126 and a second end 128 in the span-wise direction. The first end 126 is radially spaced inwardly from the second end 128, with respect to the rotational axis 106. The second end 128 denotes a transition between the dovetail portion 112 and the airfoil portion 110. As a non-limiting example, the second end 128 coincides with the root 118 of the airfoil portion 110. The dovetail portion 112 and the airfoil portion 110 can be integrally or non-integrally formed with each other.

The composite airfoil assembly 104 is coupled to the disk assembly 102 by inserting at least a portion of the dovetail portion 112 into a respective slot of the plurality of slots 108. The composite airfoil assembly 104 is held in place by frictional contact with the slot 108 or can be coupled to the slot 108 via any suitable coupling method such as, but not limited to, welding, adhesion, fastening, or the like. While only a single composite airfoil assembly 104 is illustrated, it will be appreciated that there can be any number of one or more composite airfoils assemblies 104 coupled to the disk assembly 102. As a non-limiting example, there can be a plurality of composite airfoil assemblies 104 corresponding to a total number of slots of the plurality of slots 108.

Figure 3:
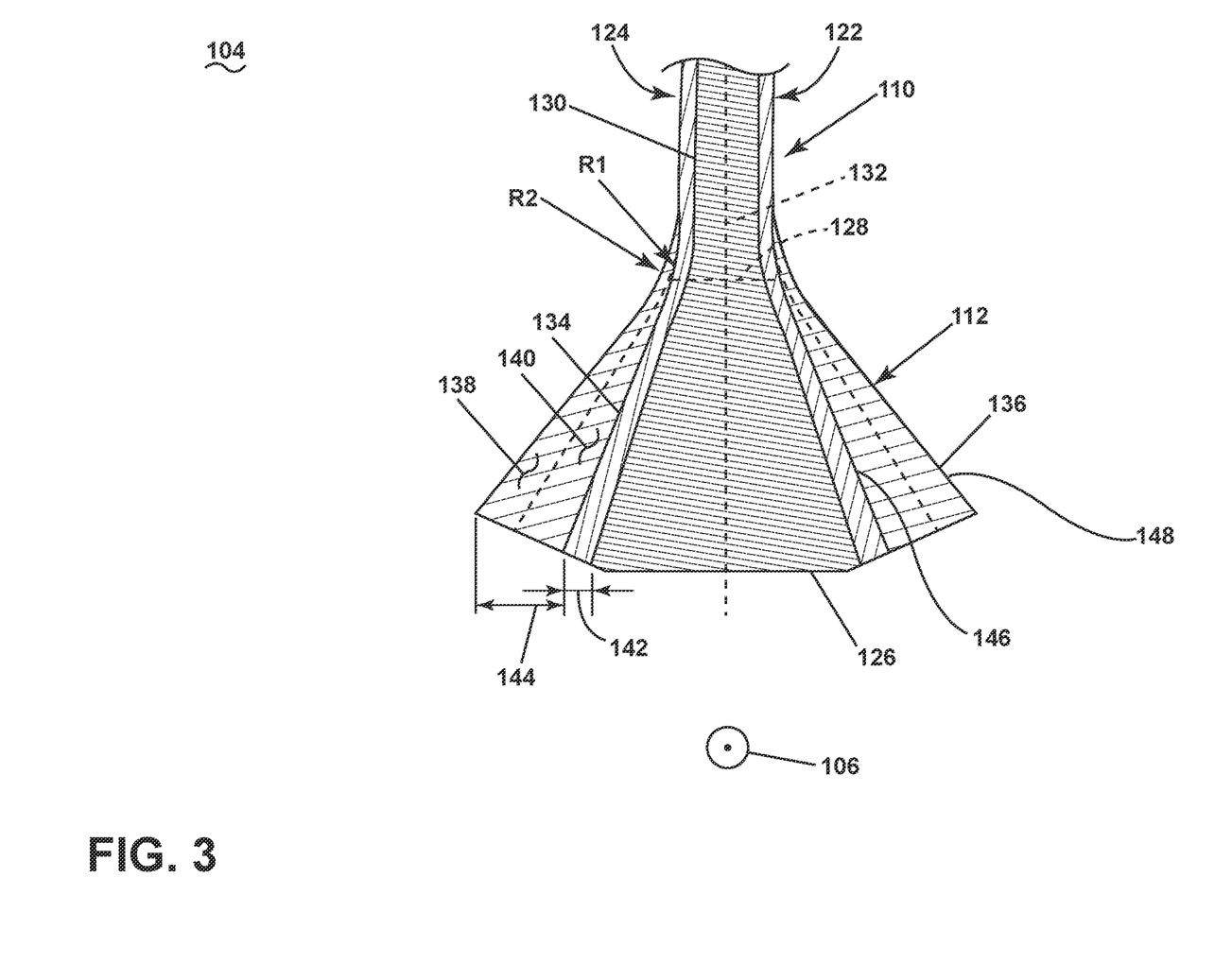
FIG. 3 is a schematic cross-sectional front view of a section of the composite airfoil assembly as seen from sectional line III-III of FIG. 2, further illustrating a first skin and a second skin.

FIG. 3 is a schematic cross-sectional front view of a portion of the composite airfoil assembly 104 as seen from sectional line III-III of FIG. 2. The composite airfoil assembly 104 extends along a centerline axis 132 extending from the first end 126 of the dovetail portion 112 to the tip 120 (FIG. 2) of the airfoil portion 110. The centerline axis 132 is equidistant from respective opposing portions of the composite airfoil assembly 104. The centerline axis 132 can be linear or non-linear. The composite airfoil assembly 104 can be symmetric or non-symmetric about the centerline axis 132. The centerline axis 132 can also be a body axis, which, in the case of an asymmetrical airfoil, may not extend along the center of the body.

The composite airfoil assembly 104 includes a core 130 defining and extending between respective portions of the dovetail portion 112 and the airfoil portion 110. The core 130 can extend from the first end 126 to the tip 120 along the centerline axis 132. A first skin 134 overlies the core 130, and therefore, respective portions of the dovetail portion 112 and the airfoil portion 110. A second skin 136 overlies a portion of the first skin 134 overlying the dovetail portion 112, and therefore overlies the dovetail portion 112. As used herein, a "skin" refers to a layer of material having multiple plies or layers of composite materials. The core 130, the first skin 134 and the second skin 136 can each define respective portions of the first end 126 of the dovetail portion 112. The first skin 134 can define an outer wall of the airfoil portion 110. The first skin 134 can be any suitable type of skin. As a non-limiting example, the first skin 134 can be defined as a laminate skin.

As illustrated, the dovetail portion 112 includes a flared cross-sectional area that extends radially outward, with respect to the centerline axis 132, from the second end 128 to the first end 126. The first skin 134 and the second skin 136 follow this flared cross-sectional area of the dovetail portion 112.

The first skin 134 includes a first outer face 146 formed along a portion of the first skin 134 overlies the dovetail portion 112. The second skin 136 includes a second outer face 148 formed along a portion of the second skin 136 overlies the dovetail portion 112. The second skin 136 directly overlies and contacts the first outer face 146. The second outer face 148 can extend non-parallel to the first outer face 146.

The second skin 136 can terminate at or be axially displaced from, with respect to the centerline axis 132, the transition between the airfoil portion 110 and the dovetail portion 112 (e.g., at the second end 128). As a non-liming example, the second skin 136 can extend axially past the second end 128 and overlie a portion of the airfoil portion 110. As a non-limiting example, the second skin 136 can extend an amount that is less than or equal to 5% of a total length of the airfoil portion 110 in the span-wise direction.

The first skin 134 includes a first thickness 142 at the first end 126. The second skin 136 can include a second thickness 144 at the first end 126, equal to or non-equal to the first thickness 142. As a non-limiting example, the second thickness 144 can be larger than the first thickness 142.

The first skin 134 can define a first radius (R1) at the transition between the airfoil portion 110 and the dovetail portion 112. The second skin 136 can define a second radius (R2) at the transition between the airfoil portion 110 and the dovetail portion 112. The second radius (R2) can be less than or equal to the first radius (R1). The first radius (R1) can be non-equal to the second radius (R2).

Each side or only a single side of the composite airfoil assembly 104 can include the first radius (R1) and the second radius (R2) as described herein. As a non-limiting example, the first radius (R1) and the second radius (R2) can be applied to only a side of the composite airfoil assembly 104 corresponding to the pressure side 122 of the airfoil portion 110.

The core 130, the first skin 134 and the second skin 136 can each include any suitable composite material as described herein. As a non-limiting example, at least a portion of the core 130, the first skin 134 and the second skin 136 can include a PMC material. As a non-limiting example, the core 130 can include braided or woven fibers. As a non-limiting example, the first skin 134 and the second skin 136 can each include multiple PMC plies. While described in terms of PMC plies, it will be appreciated that the composite airfoil assembly 104 can include any suitable formation and further include any suitable composite plies. Therefore, as used herein, the term "composite ply" or iterations thereof, refers to any suitable composite ply architecture and is not so limited to PMC plies.

The second skin 136 can optionally include a plurality of layers made of differing materials. As a non-limiting example, the second skin 136 can include two layers of composite plies. A first layer 138 of the at least two layers can include a machining ply, while a second layer 140 of the at least two layers can include a filler ply. The transition between the first layer 138 and the second layer 140 is denoted by a phantom line within the second skin 136. The second layer 140 (e.g., the filler ply) can be provided closer to the first skin 134 than the machining ply. As a non-limiting example, the second radius (R2) can be machined into a portion of the second skin 136 including the machining ply through any suitable machining method. Alternatively, the second skin 136 can include a plurality of layers of the same material, but having differing material properties.

The first layer 138 and the second layer 140 can further be defined by the orientation of the fibers that make up the composite plies of the first layer 138 and the second layer 140. The orientation of the fibers can be the same or different between the first layer 138 and the second layer 140. As a non-limiting example, the first layer 138 or the second layer 140 can include a unidirectional fiber orientation, a plain weave or a bi-directional fiber orientation (e.g., a woven or a braided fiber).

While described in terms of the second skin 136 have a plurality of layers (e.g., the first layer 138 and the second layer 140), it will be appreciated that the second skin 136 can include a single layer. In the instance of the second skin 136 having a single layer, the second skin 136 can be made entirely of the machining ply such that the second radius (R2) can be machined into a respective portion of the second skin 136.

The core 130, the first skin 134, and the second skin 136 can further be defined by their material properties. As a non-limiting example, the core 130 and the laminate skin 134 can each include differing material properties. As a non-limiting example, a bulk modulus of the core 130, a bulk modulus of the first skin 134 and a bulk modulus of the second skin 136 can each be non-equal. As a non-limiting example, the core 130 includes a material having a first bulk modulus, the first skin 134 includes a material having a second bulk modulus, and the second skin 136 includes a material having a third bulk modulus. As a non-limiting example, the core 130 can have a bulk modulus that is greater than or less than a bulk modulus of the first skin 134, which can be greater than or less than the bulk modulus of the second skin 136. As a non-limiting example, each layer of differing material of the second skin 136 can have non-equal bulk moduli with respect to one another, the core 130 or the first skin 134.

During rotation of the disk assembly 102 (FIG. 2), and therefore during the rotation of the composite airfoil assembly 104, the composite airfoil assembly 104 rotates in a first circumferential direction, with respect to the rotational axis 106. A force, due to inertia, is applied to the composite airfoil assembly 104 that causes the composite airfoil assembly 104 to flex in a second circumferential direction, opposite the first circumferential direction. It is contemplated that the composite airfoil assembly 104 will experience higher flexing than a conventional airfoil assembly made of conventional materials (e.g., metals) as composite materials are more susceptible to bending and flexing. The bending and the flexing of the composite materials will be referred to as the compression of the composite materials. It is contemplated that the first radius (R1) and the second radius (R2), as described herein, can be provided, at least, on the side of the composite airfoil assembly 104 that has the highest anticipated mechanical stresses.

It is contemplated that the mechanical stress is greatest at the transition between the dovetail portion 112 and the airfoil portion 110 (e.g., at the second end 128). The inclusion of the second skin 136, specifically the second skin 136 having the second radius (R2) greater than the first radius (R1), reduces the stresses associated with the rotation of the composite airfoil assembly 104. This, in turn, ensures that the composite airfoil assembly 104 is able to withstand the mechanical stresses associated with normal use of the composite airfoil assembly 104.

Benefits associated with the use of a composite airfoil assembly include a lighter airfoil assembly without sacrificing performance of the airfoil assembly when compared to a non-composite (e.g., cast) airfoil assembly. In other words, the material used for the composite airfoil assembly are lighter than the materials used for the non-composite airfoil assembly and do not sacrifice the ability to perform as intended within the turbine engine. The decreased weight, in turn, means an increased efficiency of the turbine engine when compare to a conventional turbine engine including the non-composite airfoil assembly.

Further benefits associated with the composite airfoil assembly include an airfoil assembly able to withstand the mechanical stresses associated with the operation of the composite airfoil assembly when compared to a conventional composite airfoil assembly. For example, the conventional composite airfoil assemblies can include a single skin (e.g., a laminate skin) that follows a flared cross-sectional area of the dovetail. These conventional airfoil assemblies, however, include only the laminate skin having uni-directional plies purposing as a structural layer of the conventional airfoil assembly. During rotation of the conventional composite airfoil assembly, the composite material will flex and compress towards the direction of rotation. This flexing is not experienced in conventional blade assemblies including non-composite materials. This flexing of the composite materials can result in higher mechanical stresses on the materials of the conventional composite airfoil assembly. The composite airfoil assembly, as described herein, includes the first skin (e.g., the laminate skin) and a second skin overlying the first skin. This addition of the second skin provides increased resilience to the mechanical stresses associated with the rotation of the composite airfoil assembly as the second skin reduces the radius of along the transition between the airfoil portion and the dovetail portion. This increased resilience to the mechanical stresses is especially adapted for the anticipating flexing or compression of the composite materials that will occur during rotation of the composite airfoil assembly. This radius, as discussed herein, ultimately results in the composite airfoil assembly being better suited to withstand the mechanical stresses anticipated during rotation of the composite airfoil assembly when compared to the conventional composite airfoil assembly with only the single skin.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A composite blade assembly for a turbine engine, the composite blade assembly comprising a core comprising a composite structure and defining a dovetail portion and a blade portion, with a transition defined between the dovetail portion and the blade portion, a first skin, having at least one composite ply, overlying the core and defining a first radius at the transition, and a second skin, having at least one composite ply, overlying a portion of the first skin overlaying the dovetail portion, and defining a second radius at the transition, with the second radius being less than or equal to the first radius.

A composite airfoil assembly comprising a core comprising a composite structure and defining a dovetail portion and an airfoil portion, with a transition defined between the dovetail portion and the airfoil portion, a first skin, having at least one composite ply, overlying the core and defining a first radius at the transition, and a second skin, having at least one composite ply, overlying a portion of the first skin overlaying the dovetail portion, and defining a second radius at the transition, with the second radius being less than or equal to the first radius.

The composite blade assembly of any preceding clause, wherein the second radius is less than the first radius.

The composite blade assembly of any preceding clause, wherein the second skin extends beyond the transition an amount that is less than 5% of the span of the blade portion.

The composite blade assembly of any preceding clause, wherein the composite structure of the core comprises either a braided or woven fabric.

The composite blade assembly of any preceding clause, wherein the at least one composite ply of the second skin includes multiple plies.

The composite blade assembly of any preceding clause, wherein the multiple plies of the second skin comprise at least one of filler plies or machining plies.

The composite blade assembly of any preceding clause, wherein the second radius is machined into the machining ply.

The composite blade assembly of any preceding clause, wherein the second skin includes a first layer and a second layer overlying the first layer.

The composite blade assembly of any preceding clause, wherein the at least one composite ply of the first skin is a laminate skin.

The composite blade assembly of any preceding clause, wherein the second radius is machined into the second skin.

The composite blade assembly of any preceding clause, wherein the second skin overlies the first radius.

The composite blade assembly of any preceding clause, wherein the core includes a material having a first bulk modulus, the first skin includes a material having a second bulk modulus, and the second skin includes a material having a third bulk modulus.

The composite blade assembly of any preceding clause, wherein at least two of the first bulk modulus, the second bulk modulus and the third bulk modulus are non-equal.

The composite blade assembly of any preceding clause, wherein at least a portion of the core, the first skin and the second skin each include a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix The composite blade assembly of any preceding clause, wherein at least a portion of the core, the first skin and the second skin each include a polymer matrix composite ply.

The composite blade assembly of any preceding clause, wherein the first skin includes a first outer surface confronting the second skin and the second skin includes a second outer surface opposite the first outer surface, with the first outer surface being non-parallel to the second outer surface.

The composite blade assembly of any preceding clause 1, wherein the first skin defines an outer wall of the blade portion.

The composite blade assembly of any preceding clause, wherein the composite blade assembly is rotatable about a rotational axis, the dovetail portion extends between a first end and a second end, radially opposite the first end and confronting the blade portion, and the first skin includes a first circumferential thickness at the second end and the second skin includes a second circumferential thickness, different from the first circumferential thickness, at the second end.

The composite blade assembly of any preceding clause, wherein the second circumferential thickness is less than the first circumferential thickness.

The composite blade assembly of any preceding clause, wherein the turbine engine includes a fan section, a compressor section, a combustion section and a turbine section in serial flow arrangement with the composite blade assembly being provided within the fan section.

What is claimed is:

1. A composite blade assembly for a turbine engine, the composite blade assembly comprising:
    a core comprising a composite structure and defining a dovetail portion and a blade portion, with a transition defined between the dovetail portion and the blade portion, the blade portion including an outer wall extending between a root and a tip in a span-wise direction, the core including a first material having a first bulk modulus, the core having a centerline, the dovetail portion having a distal end axially opposite the transition, with respect to the centerline;
    a first skin, having at least one composite ply, overlying the core and defining a first radius at the transition, the first skin having a first portion provided along the dovetail portion, and a second portion defining at least a portion of the outer wall, the first skin having a second material having a second bulk modulus, different from the first bulk modulus; and
    a second skin, having at least one composite ply, overlying at least a portion of the first portion of the first skin, the second skin defining a second radius at the transition, the second skin extending to the distal end, the second skin including a radial thickness that continuously decreases in size from the distal end to the transition.

2. The composite blade assembly of claim 1, wherein the second radius is less than the first radius.

3. The composite blade assembly of claim 1, wherein the second skin extends beyond the transition by an amount that is less than 5% of a length of the blade portion in the span-wise direction.

4. The composite blade assembly of claim 1, wherein the composite structure of the core comprises either a braided or woven fabric.

5. The composite blade assembly of claim 1, wherein the at least one composite ply of the second skin includes multiple plies.

6. The composite blade assembly of claim 5, wherein the multiple plies of the second skin comprise at least one of filler plies or machining plies.

7. The composite blade assembly of claim 6, wherein the second radius is machined into the machining plies.

8. The composite blade assembly of claim 1, wherein the second skin includes a first layer and a second layer overlying the first layer.

9. The composite blade assembly of claim 1, wherein the at least one composite ply of the first skin is a laminate skin.

10. The composite blade assembly of claim 1, wherein the second radius is machined into the second skin.

11. The composite blade assembly of claim 1, wherein the second skin overlies the first radius.

12. The composite blade assembly of claim 1, wherein the second skin includes a third material having a third bulk modulus, and the third bulk modulus is non-equal to at least one of the first bulk modulus or the second bulk modulus.

13. The composite blade assembly of claim 12, wherein each of the first bulk modulus, the second bulk modulus and the third bulk modulus are non-equal.

14. The composite blade assembly of claim 1, wherein the second skin includes a third material, and the first material, the second material, and the third material each include a composite material including at least one of a polymer matrix composite, a ceramic matrix composite, a metal matrix composite, carbon fiber, polymeric resin, a thermoplastic, a bismaleimide, a polyimide, an epoxy resin, a glass fiber, or a silicon matrix.

15. The composite blade assembly of claim 14, wherein at least a portion of the core, the first skin and the second skin each include a polymer matrix composite ply.

16. The composite blade assembly of claim 1, wherein the first skin includes a first outer surface confronting the second skin and the second skin includes a second outer surface opposite the first outer surface, with the first outer surface being non-parallel to the second outer surface.

17. The composite blade assembly of claim 1, wherein the turbine engine includes a fan section, a compressor section, a combustion section and a turbine section in serial flow arrangement with the composite blade assembly being provided within the fan section.

18. A composite blade assembly for a turbine engine, the composite blade assembly comprising:
    a core comprising a composite structure and defining a dovetail portion and a blade portion, with a transition defined between the dovetail portion and the blade portion, the blade portion including an outer wall extending between a root and a tip in a span-wise direction, the core including a first material having a first bulk modulus, the core having a centerline, the dovetail portion having a distal end axially opposite the transition, with respect to the centerline;
    a first skin, having at least one composite ply, overlying the core and defining a first radius at the transition, the first skin having a first portion provided along the dovetail portion, and a second portion defining at least a portion of the outer wall, the first skin having a second material having a second bulk modulus, different from the first bulk modulus, the first skin defining a first radial thickness at the distal end; and
    a second skin, having at least one composite ply, overlying at least a portion of the first portion of the first skin, the second skin defining a second radius at the transition, the second skin extending to the distal end and the second skin defining a second radial thickness at the distal end and wherein the second radial thickness is larger than the first radial thickness.

\* \* \* \* \*